United States Patent [19]

Chiller et al.

[11] Patent Number: 5,465,293
[45] Date of Patent: Nov. 7, 1995

[54] APPARATUS AND METHOD FOR SCREENING FOREIGN INCOLLECT CALLS TO DOMESTIC NON-COLLECT CALL TELEPHONE NUMBERS TO REDUCE FRAUD

[75] Inventors: Martin S. Chiller, Mt. Arlington; Peter I. Coulter, Piscataway; Richard J. Petillo, Long Valley, all of N.J.

[73] Assignee: AT&T Corp., Murray Hill, N.J.

[21] Appl. No.: 175,875

[22] Filed: Dec. 30, 1993

[51] Int. Cl.[6] .................................................. H04M 1/66
[52] U.S. Cl. .......................... 379/189; 379/67; 379/112; 379/188; 379/111; 379/201; 379/207
[58] Field of Search ...................... 379/111, 112, 379/115, 126, 121, 188, 189, 201, 207, 197, 196, 67

[56] References Cited

U.S. PATENT DOCUMENTS

| | | | |
|---|---|---|---|
| 4,756,020 | 7/1988 | Fodale | 379/197 |
| 4,827,500 | 5/1989 | Binkero et al. | 379/207 |
| 4,922,519 | 5/1990 | Daudelin | 379/67 |
| 4,924,510 | 5/1990 | Le | 379/207 |
| 5,046,183 | 9/1991 | Dorst et al. | 379/112 |
| 5,093,858 | 3/1992 | Hird et al. | 379/144 |
| 5,136,636 | 8/1992 | Wegrzynowicz | 379/201 |
| 5,153,907 | 10/1992 | Pugh et al. | 379/207 |
| 5,333,185 | 7/1994 | Burke et al. | 379/207 |

*Primary Examiner*—Jeffery A. Hofsass
*Assistant Examiner*—Parag Dharia
*Attorney, Agent, or Firm*—Jack R. Penrod

[57] ABSTRACT

An apparatus and method for automating the processing of foreign collect calls to U.S. telephone numbers. By automating the check of the U.S. telephone number against the pay telephone numbers and other non-billable numbers in U.S. databases, the amount of foreign operator effort required is reduced. The apparatus and method also reduces the losses to U.S. telephone companies due to foreign collect call processing errors and foreign collect calls fraudulently completed to pay telephones or other non-billable telephone numbers.

21 Claims, 9 Drawing Sheets

APPARATUS AND METHOD FOR SCREENING FOREIGN INCOLLECT CALLS TO DOMESTIC NON-COLLECT CALL TELEPHONE NUMBERS TO REDUCE FRAUD

TECHNICAL FIELD

This invention relates to telephone call processing and, more particularly, to an apparatus and method for screening inbound collect calls from foreign telephone systems to reduce the number of collect calls completed to domestic telephone numbers which are non-billable for collect calls, such as pay telephones.

BACKGROUND OF THE INVENTION

Domestic collect calls, i.e. those made entirely within the United States, are almost universally undergo automatic screening by a U.S. operator position to verify that the telephone station receiving the collect call is one that does not prohibit collect call billing. This automatic screening utilizes two databases which contain all of telephones numbers which are non-billable for collect calls. One of these databases is operated and maintained by the U.S. long distance company and the other database is operated and maintained by the local exchange company (LEC) of the region. These two databases are customized for each region of the United States in order to reflect the individual needs of each region. The best example of a number which is non-billable for collect calls a pay telephone. If a person at a pay telephone accepts a collect call, there is no mechanism for collecting the amount billed for the call from that person. To accept a collect call knowing that the call will not be paid is fraud on the telephone company providing the service. To reduce such fraud, at least one of the two databases contains the numbers of all the pay telephones for its region. At one time such a database was fairly simple because one or two ranges of exchange numbers were dedicated exclusively to pay telephones, such as NXX-8000 to NXX-8999 or NXX-9000 to NXX-9999. However, with growth in population density in some regions, the former dedicated ranges ceased to be dedicated exclusively to pay telephones and other ranges ceased to be exclusively non-pay telephones. At this point, there was no easy way to distinguish between non-pay and pay telephone numbers.

In addition to the pay telephone database(s), the regional LEC database contains numbers of other telephones in the region which are also non-billable for collect calls. An example of such a number would be a hospital or college, where a telephone is needed for business communications during normal business hours, but often it is hard to supervise who uses that telephone twenty-four hours a day. For such applications, hospitals, colleges and similar entities may prohibit the LEC from billing collect calls or similar operator assisted calls to such telephones. The regional LEC database is the responsibility of each LEC to maintain. By the nature of these telephone numbers, they are not restricted to any particular range.

Screening collect calls using both non-billable for collect calls databases, the pay telephone database and the regional LEC non-billable number database, effectively prevents fraudulent collect calls from being completed for domestic collect calls. Unfortunately, screening of collect calls assisted by foreign public telephone and telegraph (PTT) operators is processed differently than domestic collect calls. Foreign PTT operators historically used a collect call screening method based on a route bulletin. The route bulletin listed the ranges, for example NXX-8000-NXX-8999, in which the numbers of the pay telephones for a particular city or region were found. If a collect call was to a U.S. telephone number in a range listed in the route bulletin, the procedure required the foreign PTT operator to first verify with a U.S. long distance operator that the number is indeed a number to which a collect call could be billed. If the number was not verified as a number to which a collect call could be billed, the procedure required the foreign PTT operator to reject the collect call. If the number was verified as a number to which a collect call could be billed, or if the number was not in the ranges listed in the route bulletin, then the foreign PTT operator could place the collect call to a U.S. telephone number. When it reached the point in a particular region that pay telephones had come to have numbers in all or almost all possible ranges, this meant that the route bulletin procedure for that region required the foreign PTT operators to verify every collect call to that region with a U.S. long distance operator. At that point the procedure took too much time on the part of the foreign PTT operators. Additionally, verbally repeating every number of a collect call to a U.S. operator to be punched into the two databases for verification left too much room for error. Foreign PTT operators refused to verify every collect call to the U.S. with a U.S. long distance operator before placing the call into the international network. The international payment rules, however, charged the U.S. companies for the fraudulently completed, non-billable collect calls, and, although the percentage of non-billable collect calls was low, the PTT's refusal to verify resulted in very large losses to U.S. long distance and LEC companies.

As a compromise, the foreign PTF operators have agreed to follow the procedure of verifying collect calls to numbers in the non-billable for collect call number ranges (NXX-8000 to 8999 and NXX-9000 to 9999) as they used to, but they have not agreed to follow the procedure for collect calls to numbers in any other ranges. This means that foreign collect calls will not be screened for a good portion of the non-billable telephone numbers in the LEC database. Also, to the extent that there are not enough numbers in the 8000 and 9000 ranges for all of the pay telephones in a region, a portion of collect calls to known pay telephones will not be screened. Thus, there is a need in the art to replace the present procedure that uses a route bulletin with limited verification ranges with an efficient and dependable screening apparatus and method to reduce foreign incollect calls to telephone numbers which are non-billable for collect calls.

SUMMARY OF THE INVENTION

Briefly stated in accordance with one aspect of the invention the aforementioned long felt need is fulfilled by providing an apparatus and method for quickly screening a telephone number to which a foreign incollect call is directed for verifying its billable status. The apparatus and method automate and simplify the screening process and also reduce the chances for human error.

In one aspect of the invention, the long felt need is fulfilled by providing an apparatus for screening a foreign incollect call directed to a U.S. telephone number. The apparatus includes a database containing a plurality of telephone numbers which are non-billable for collect calls; means for responding to a special access code entered by a foreign operator processing the foreign in collect call with an audible prompt for the foreign operator to enter the telephone number to which the foreign collect call is directed; means for receiving and storing the telephone number to which the foreign collect call is directed; means for searching the database to determine if the telephone number to which the foreign incollect call is directed is found therein; and means for emitting an audible indicator to the foreign operator that the telephone number is non-billable for collect calls if it is found in said database. Alternatively, instead of the means for emitting an audible indicator, a means for connecting the foreign operator to a U.S. long distance operator if the telephone number to which the foreign incollect call is directed is found in the database. Also, if the regional LEC database has non-billable for collect call telephone numbers contained therein that are not contained in the U.S. long distance company database, then fraud is further reduced by including means for searching the LEC database of the region to determine if the telephone number to which the foreign incollect call is directed is found therein as additional element that can cause the means for emitting the audible indicator to the foreign operator that the telephone number is non-billable for collect calls to send its indicator back to the foreign operator.

In another aspect of the invention, the long felt need is fulfilled by an apparatus for automatically screening incoming foreign calls to identify to each foreign operator assisting such a call if the call is directed to domestic non-billable for collect calls telephone number. The apparatus includes means for decoding a foreign operator language digit on an incoming call to determine if the call is an operator assisted call. If the call is not operator assisted, means for completing the call normally as a non-collect-call to its telephone number completes the call to the LEC for the region. If the call is operator assisted, means for adding a special access code to the call at an international gateway switch adds a special access code to the call. Means for switching the call with the special access code from the international gateway switch to a regional long distance switch switches a special access such coded call to the regional long distance switch. Means for stripping the special access code from each call having such a code at the regional long distance switch strips the special access code from each call. After the special access code is stripped off, means for switching each operator assisted call to an operator services position system switches each such call over a dedicated trunk to the operator service position system. The operator services position system has means for determining if a telephone number to which the call is directed is in a non-billable for collect calls database associated with the operator services position system. The operator services position system also has means for switching the call to a LEC for normal completion to the telephone number to which it is directed if the call is to a telephone number that is not in the non-billable for collect calls database. The operator services position system further has means for routing the call to an audible message to the foreign operator that the call is non-billable as a collect call if the call is to a telephone number that is in the non-billable for collect calls database and means for generating a record that this operator assisted call is non-billable as a collect call. The apparatus also has means for switching the call to a LEC switch for completion after the record is generated. Alternatively, if the call is to a telephone number which is in the non-billable for collect calls database, the apparatus has means for switching the call to a U.S. long distance operator to determine if the call is a collect call or some other type of operator assisted call and if the call is a collect call arranging an alternative billing, or if the call is some other type of operator assisted call switching the call to the LEC for the region for completion, instead of having a means for switching every operator assisted call to a non-billable for collect calls telephone number to the LEC for the region for completion. In another alternative to this aspect of the invention, the international gateway switch has means for switching each operator assisted call to an operator services position system which switches each such call over a dedicated trunk to an operator services position system, instead of first adding a special access code and routing the call. Thus, in this alternative aspect, the operator services position system functions are performed by an operator services position system connected by a dedicated trunk to the international gateway switch of the U.S. long distance company instead of to the regional switch.

In another aspect of the invention, the long felt needed is fulfilled by providing a method of screening a foreign incoming call to prevent completion of a foreign incollect call to a telephone number which is non-billable for collect calls. The method includes decoding an operator language digit of a foreign incoming call to determine if the call is operator assisted. If the call is not operator assisted, it cannot be a collect call and the call is completed as a normal, non-collect call. If the call is operator assisted, it might be a collect call, so a determination is made if a telephone number to which the call is directed is listed in a database of telephone numbers which are non-billable for collect calls. If the telephone number to which the operator assisted call is directed is not listed in the database of telephone numbers which are non-billable for collect calls, the billing for the call is accepted and the call is allowed to complete to the LEC of the region. If the telephone number is listed in the database of telephone numbers which are non-billable for collect calls, the call is routed to an audible message that is transmitted back to the foreign operator that the call is directed to a non-billable for collect calls telephone number.

Alternatively, if the telephone number to which the operator assisted call is directed is listed in the database of telephone numbers which are non-billable for collect calls, the call is routed to a U.S. long distance operator to determine if the call is a collect call and if it is, to arrange alternative billing.

It is an object of the invention to provide a method for automatically processing foreign incollect calls to greatly reduce collect call processing procedural errors.

It is another object of the invention to provide an apparatus for automatically screening foreign in-collect calls to greatly reduce the revenue lost because of foreign incollect calls that are completed to non-billable for collect call numbers.

BRIEF DESCRIPTION OF THE DRAWING

While the specification concludes with the appended claims particularly pointing out and distinctly claiming the subject matter which is regarded as the invention, it is believed that the invention will be better understood from the following description taken in conjunction with the accompanying drawings in which:

DETAILED DESCRIPTION

Figure 1:
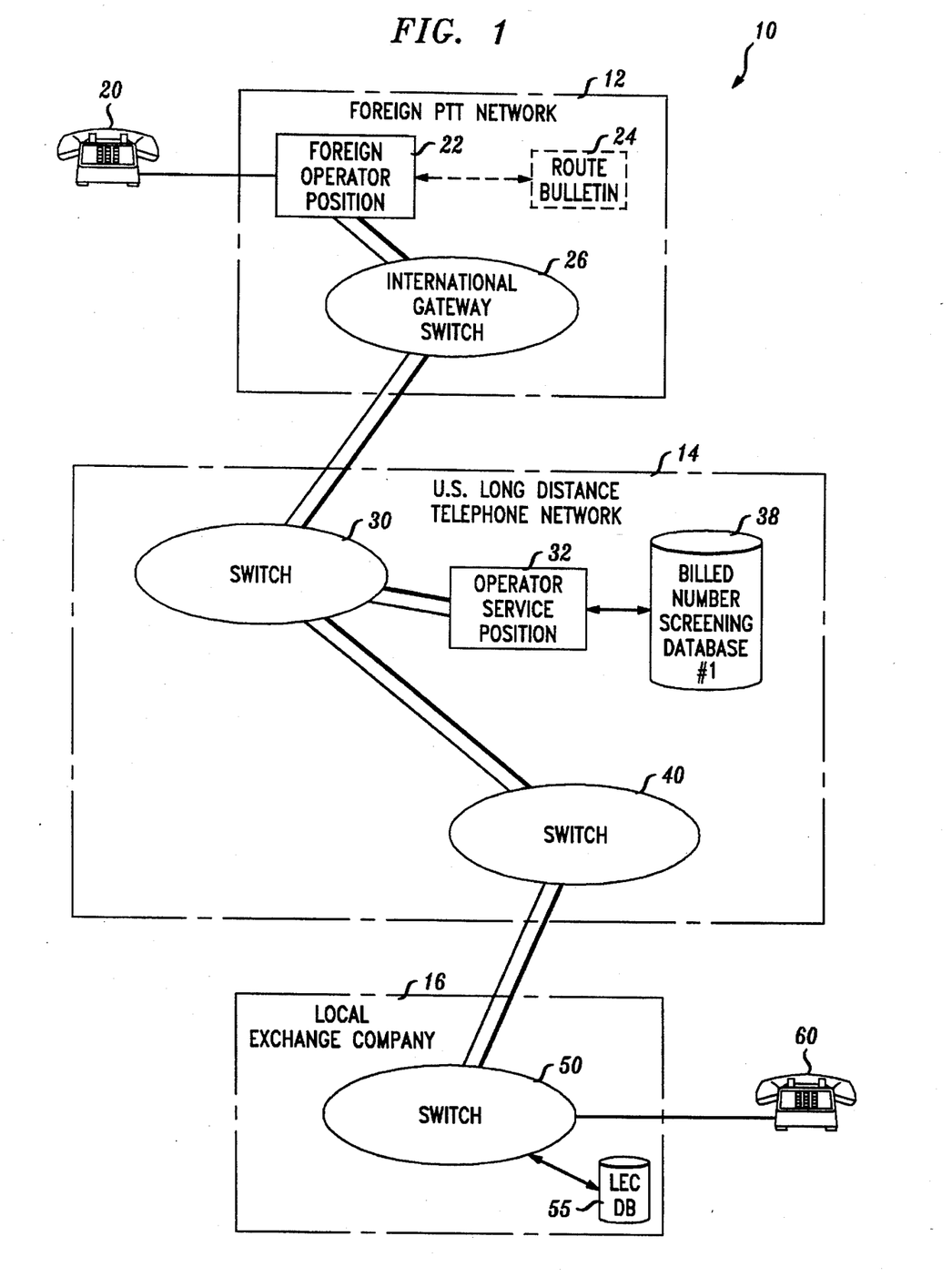
FIG. 1 is a block diagram of the existing apparatus for completing a foreign incollect call.

Referring now to FIG. 1, an existing telephone system 10 for making a collect call from a foreign country to the United States, i.e. a foreign incollect call, is shown. The telephone system 10 has three portions: a foreign PTT company portion 12, a U.S. long distance telephone network portion 14 and a U.S. local telephone network portion 16. Each of these three portions has an individual role in the completion of a foreign incollect call.

Figure 2:
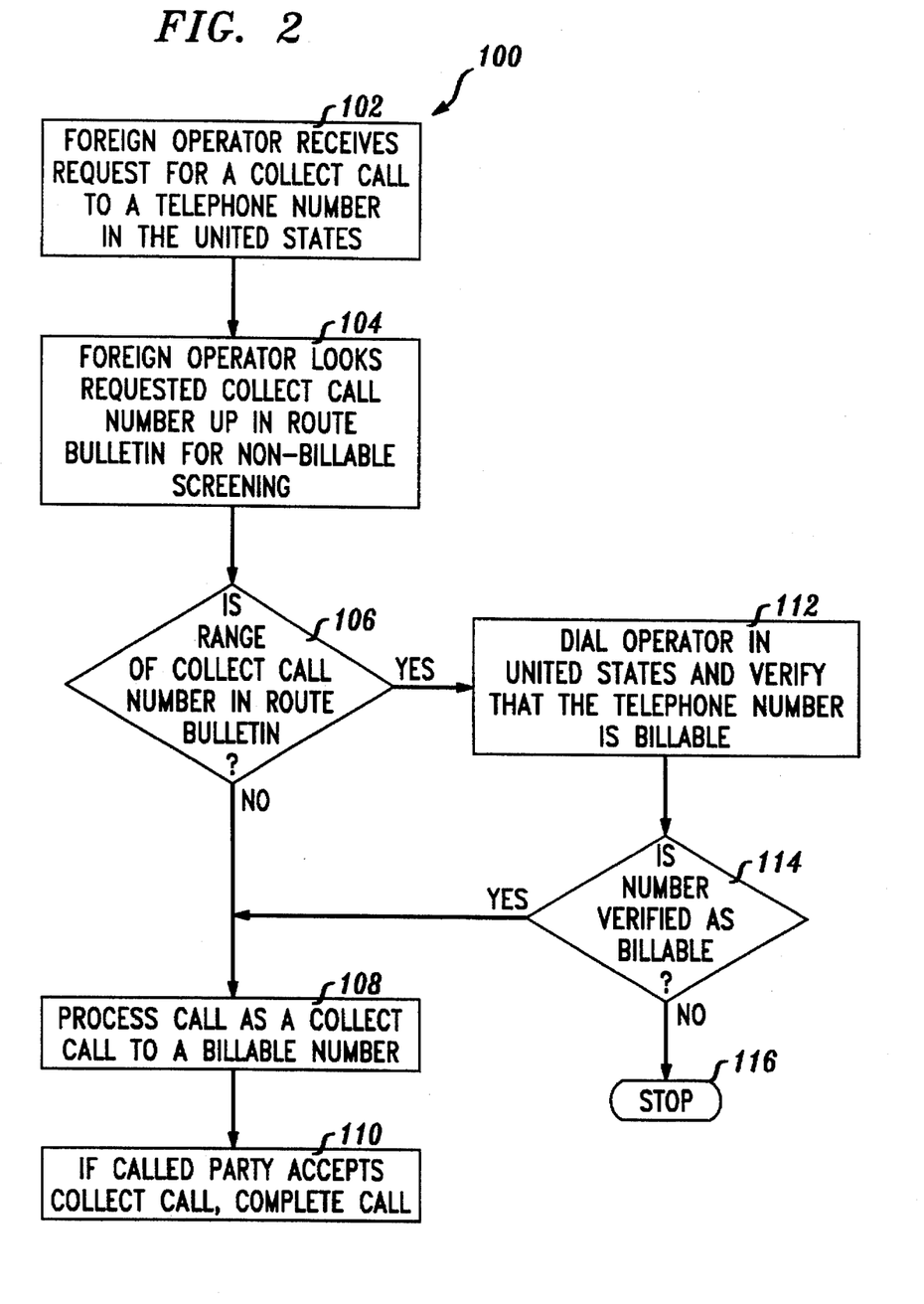
FIG. 2 is a diagram depicting an existing method of completing a foreign incollect call.

Referring to both FIG. 1 and FIG. 2, a method 100 of using the existing telephone system 10 to make a foreign incollect call will be explained. A telephone services user (not shown) uses telephone 20 and requests that a foreign PTT operator (not shown) at PTT operator station 22 make a collect call to a telephone number of telephone 60 in the United States. Foreign PTT operator at PTT operator station 22 receives this request as action 102 of method 100, puts the user on hold and looks up the city and state in route bulletin 24 to determine if a call verification is required for the call (action 104) and if verification is required (action 106), the routing number of the inward U.S. long distance operator for verifying that the telephone number is a billable number for an incollect call. Next, action 112, foreign PTT dials the routing number and is connected to U.S. long distance operator and reads the proposed incollect call number to the U.S. long distance operator at station 32. As part of action 112, the U.S. long distance operator at station 32 enters the telephone number to which the call is directed into database 38 and either verifies or does not verify that the proposed incollect call is to a billable telephone number to which a collect call may properly be completed. If the result of action 114 is that billing of the incollect call to the telephone number is not verified, then some type of audible collect call disallowed signal is transmitted from station 32 back to the foreign PTT operator assisting with the call and both the foreign and domestic telephone companies stop (action 116) processing of this call as a foreign incollect call. If the result is that the billing of a collect call to the telephone number is verified, then method 100 proceeds to action 108. If the telephone number is verified against the database 38, it is assumed that billing for the collect call will be accepted and the foreign PTT operator dials the incollect call. In action 108, the dialed call is switched through international switch 26, tandem switches 30 and 40 of U.S. long distance network 14, and local switch 50 of U. S. LEC 16 to telephone 60. If the party answering telephone 60 at action 110 accepts the foreign incollect call, the call is completed. Existing method 100 does not verify the foreign incollect call with LEC database 55, which may have additional non-billable for collect call telephone numbers.

Figure 3:
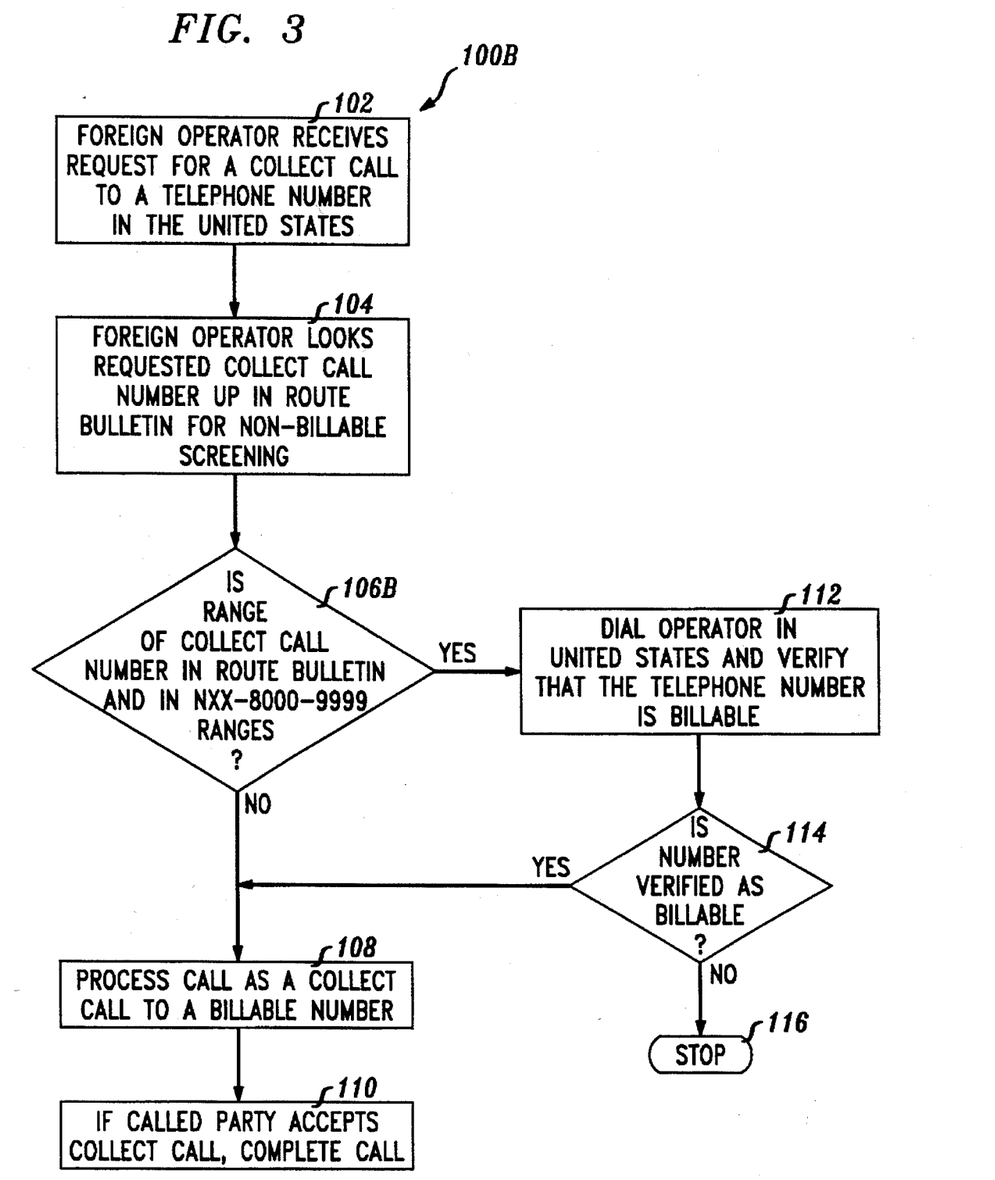
FIG. 3 is a diagram depicting another existing method of completing a foreign incollect call.

It is worth noting that although the user of telephone 20 initiated the call in method 100 and the foreign PTT operator at operator station 22 of the foreign PTT network portion 12 handles the call, the billing for the call will be to telephone service user (not shown) that is billed for the services supplied to the terminating telephone number of telephone 60. This means that the entity assisting with the call, i.e. the foreign PTT, is separate from the entity billing for and collecting money for the call, i.e. the U.S. long distance and the local exchange companies. Separation of these two activities tends to separate the priorities of the entities involved. In the case of a foreign collect call, the priority of the foreign PTT operator at operator station 22 is to complete each collect call as quickly and efficiently as possible. Whether or not the charge for the collect call can be successfully billed to the telephone number of telephone 60 tends to be of lesser priority. This is especially true if the U.S. long distance telephone company on the LEC wants every range, i.e. every collect call, verified according to method 100. The large quantity of foreign incollect calls completed to non-billable telephone numbers each year reflects the fact that foreign PTT operators sometimes refuse to verify every collect call made to the United States since they have limited interest in preventing losses to the U.S. long distance company or the LEC on a small percentage of those calls. Instead, foreign PTT operators, if they are following any verification method, are following a simplified verification method 100B shown in FIG. 3. The difference between method 100B and method 100 is action 106B, where additional limits are placed on the ranges of numbers that will be verified. In essence returning the verification procedure to the way it was 20 to 30 years ago and only verifying a small fraction of today's possible ranges for non-billable collect call telephone numbers.

Figure 4:
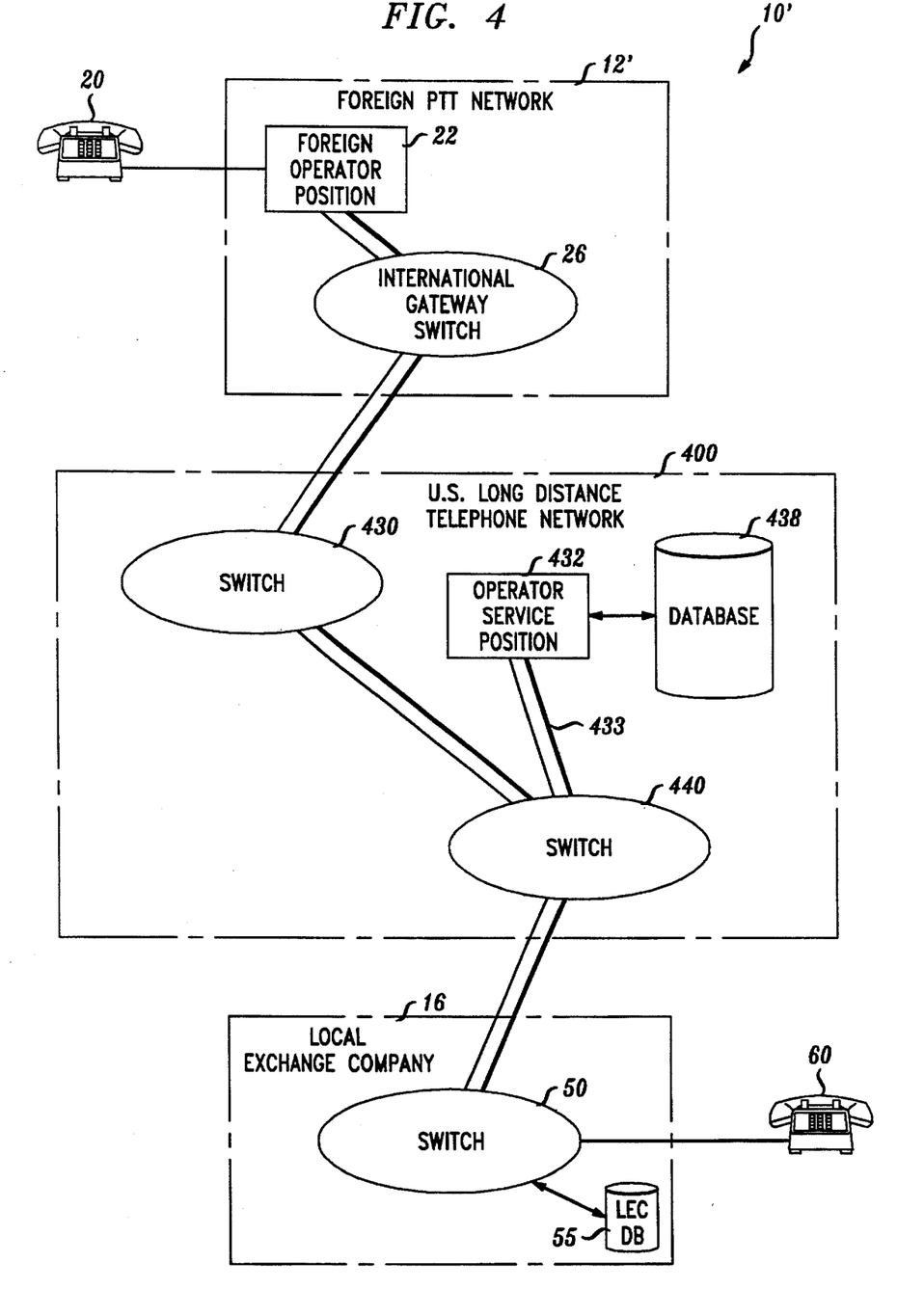
FIG. 4 is a block diagram of an apparatus for screening a foreign incollect call according to the invention.
Figure 5:
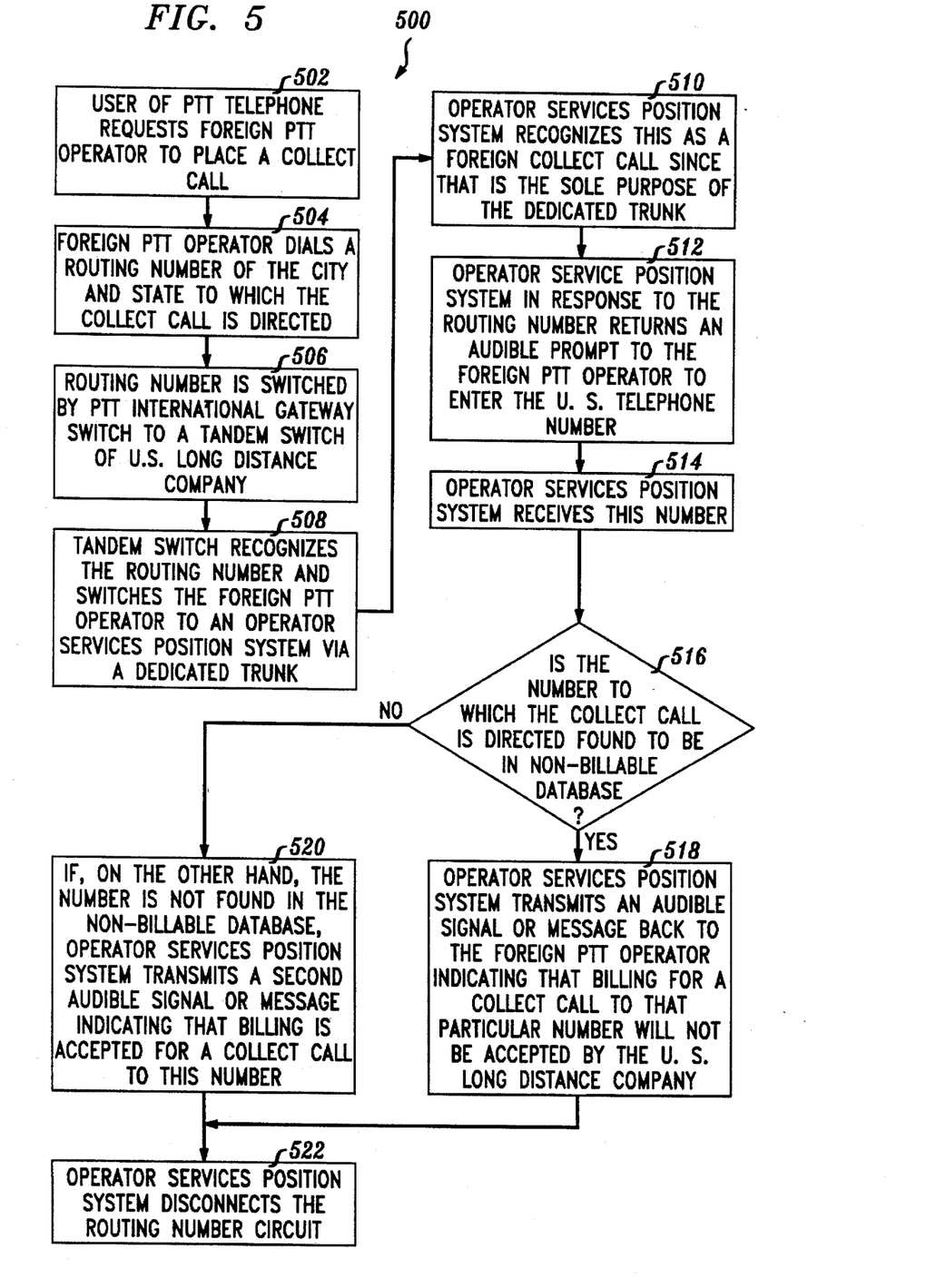
FIG. 5 is a diagram of a method for screening a foreign incollect call according to the invention.

Referring now to FIGS. 4 and 5, an apparatus 400 and a method 500 according to the present invention are shown which overcome the known problems of foreign incollect calls to non-billable numbers experienced with existing methods 100 and 100B described above.

Method 500 begins with action 502 in which the user (not shown) of PTT telephone 20 requests that foreign PTT operator at PTT operator station 22 place a collect call, essentially the same beginning as described above with respect to FIGS. 1 and 2. Next, in action 504, the foreign PTT operator, instead of consulting route bulletin for verification ranges, dials a routing number for the city and state to which the collect call is directed. This routing number is switched by international gateway switch 26 to tandem switches 430 and 440 by action 506. Next, in action 508, tandem switch 440 recognizes the routing number and switches the foreign PTT operator to an operator services position system (OSPS) 432 via dedicated trunk 433. Next, action 510, OSPS 432 recognizes this as a foreign incollect call since that is the sole purpose of dedicated trunk 433. In action 512, OSPS 432 in response to the switched routing number returns an audible prompt to the foreign PTT operator to enter the U.S. telephone number. If the foreign PTT operator responds to this prompt by outpulsing the number to which the collect call is directed, OSPS 432 in action 514 receives this number. Next, in action 516, this number is checked by OSPS 412 against the non-billable for collect call numbers stored in database 438. If the number to which the collect call is directed is found to be in database 438, OSPS 432 transmits (action 518) an audible signal or message back to the foreign PTT operator indicating that billing for a collect call to that particular number will not be accepted by the U.S. long distance network 400. If, on the other hand, the number is not found in the database 438, a query (action 517) is transmitted via trunk 433, switch 440 and switch 50 to LEC database 55. If the number to which the collect call is directed is found to be in LEC database 55, OSPS 432 transmits (action 518) an audible message or signal back to the foreign PTT operator, indicating that billing will not be accepted by the U.S. long distance network 400, in this case because the telephone number is non-billable for collect calls according to the LEC 16. If, on the other hand, the number is not found in the database 438 or database 55, OSPS 432 in action 520 transmits a second audible signal or message indicating that billing is allowed for a collect call to this number. In either case, after the transmitting of one of the audible signals or messages progresses to action 522 where OSPS 432 disconnects the routing number circuit to complete method 500.

At the end of method 500, the apparatus 400 of the U.S. long distance company has notified foreign PTT operator whether or not billing for the requested collect call will be accepted. Method 500 does away with the step of the foreign PTT verbally relaying the telephone number of the collect call to a U.S. long distance operator thereby increasing efficiency and reducing errors. Further, database 438 and contain database 55 together all non-billable numbers, not just a portion of them, so this is an improvement over both methods 100 and 100B.

Figure 6:
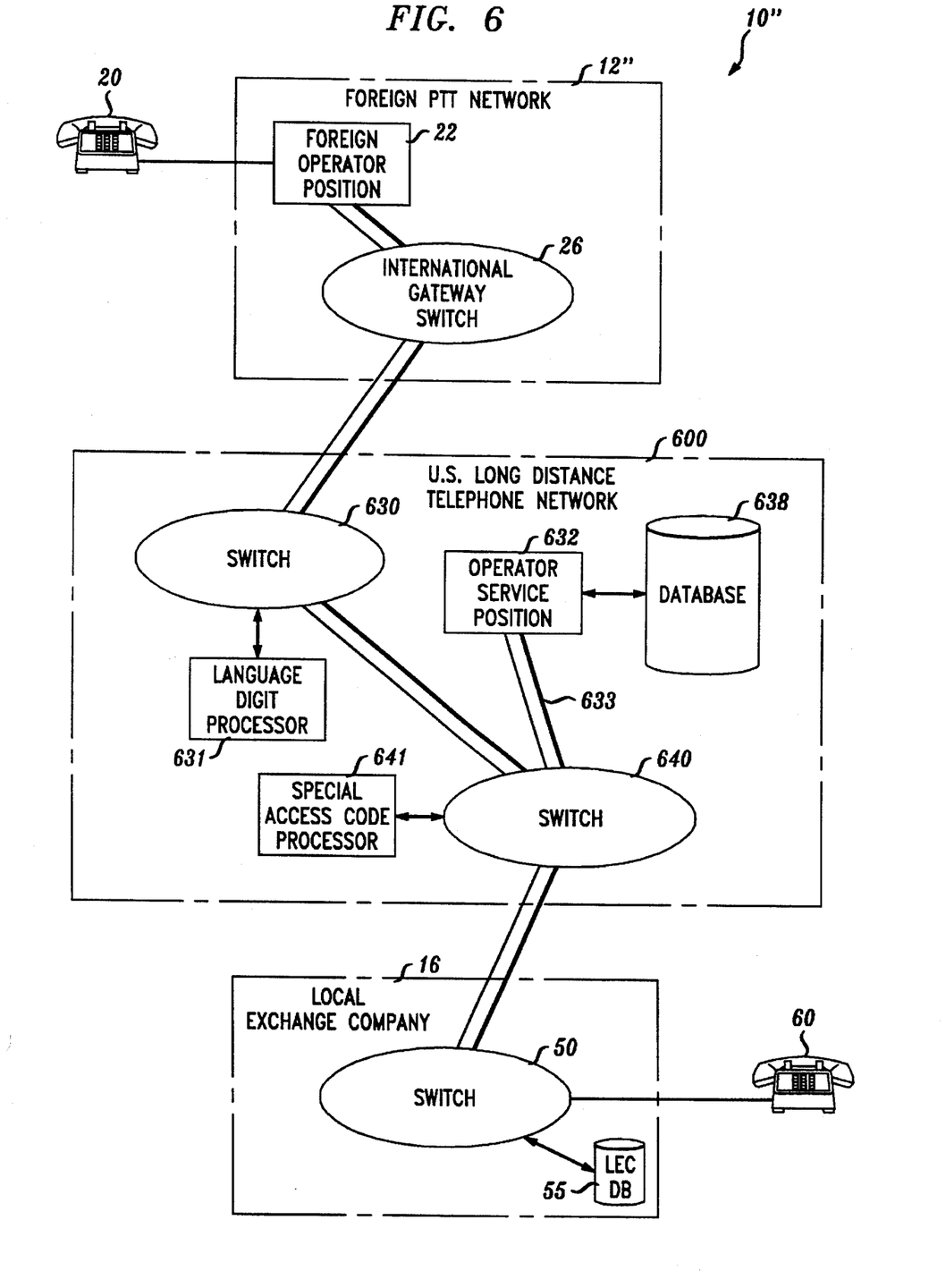
FIG. 6 is a block diagram of another apparatus for screening foreign calls according to the invention.
Figure 7:
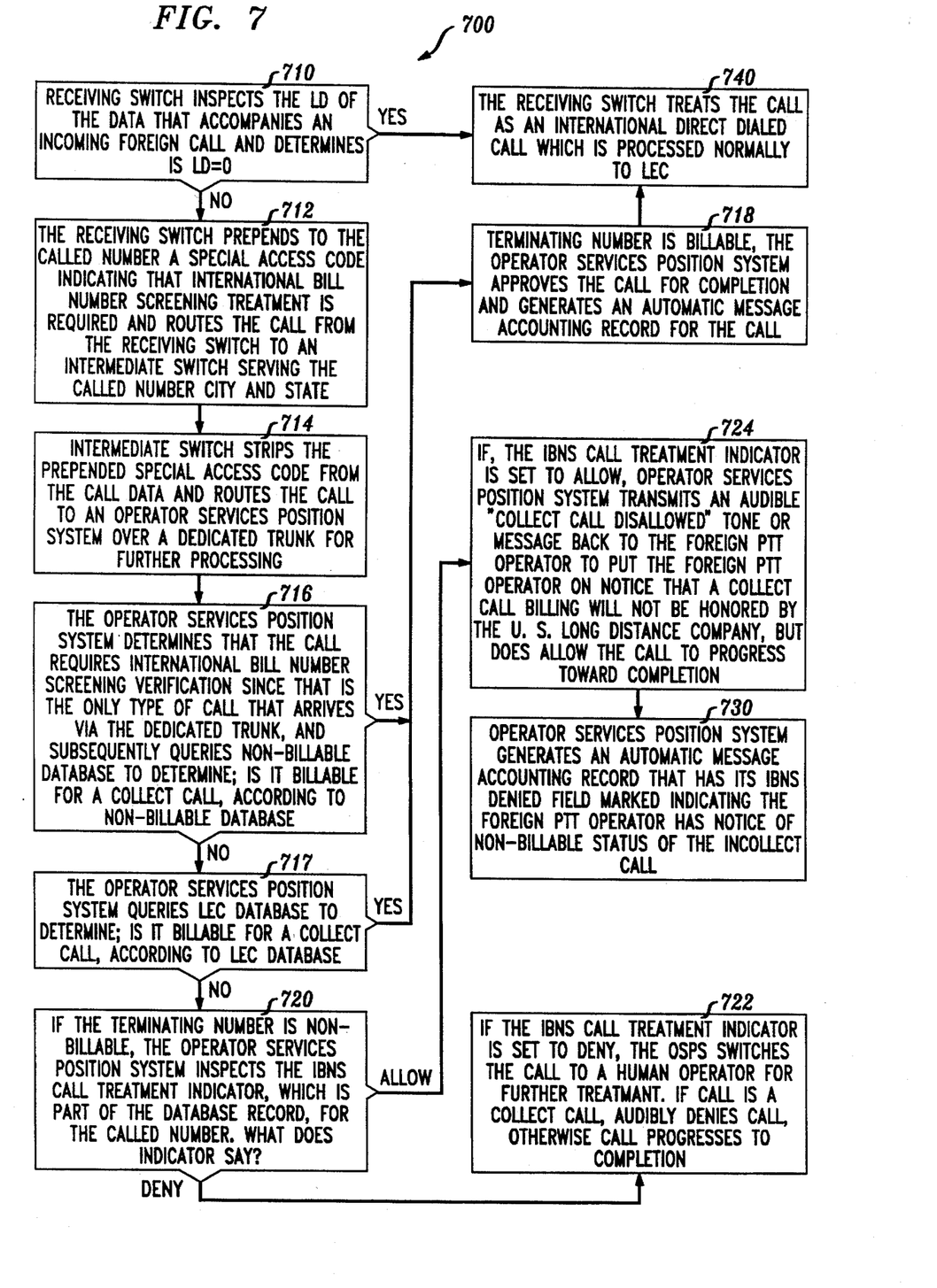
FIG. 7 is a diagram of another method for screening foreign calls according to the invention.

Referring to FIGS. 6 and 7, an apparatus 600 and a method 700 are shown that provide another way of reducing the number of foreign incollect calls that are completed to non-billable telephone numbers. Apparatus 600 and method 700 take advantage of the fact that all foreign calls have a language digit (LD) that has a value between 0 and 9 inclusively which indicates the language spoken by the foreign operator to greatly automate the processing of foreign incollect calls. An LD of zero indicates a direct dial call, an LD other than zero indicates some type of operator assisted call.

As in the previous examples, the user of telephone 20 reaches a foreign PTT operator at PTT station 22 and requests a collect call to a telephone number in the United States. The foreign PTT operator at PTT station 22 collects the called number and dials or outpulses it through the PTT international gateway switch 26 to the U.S. long distance system 600, such as the AT&T Switched Network. The PTT operator station 22 or the PTT international gateway switch 26 as mentioned above adds an LD to the outpulsed line number.

The call reaches switch 630, such as an AT&T model 4E-ISC switch. Switch 630 in action 710 of method 700 the language digit processor 631 inspects the LD of the data that accompanies the foreign incollect call to determine if the call originates as a foreign PTT operator assisted call by checking if LD is not zero.

If LD is zero, the language digit processor 631 instructs switch 630 to treat the call as an international direct dialed call (action 740), which is the normal call processing.

If LD is not zero in action 712, language digit processor 631 instructs the switch 630 to prepend to the called number a Special Access Code (SAC) indicating that International Bill Number Screening (IBNS) treatment is required, and routes the call from the receiving switch 630 to tandem switch 640, such as an AT&T model 4ESS-OSPS switch, serving the called number city and state. Tandem switch 640 is connected to an OSPS 632 which automatically performs basic services that were previously performed by human operators. Next in action 714, switch 640 strips the prepended SAC from the call data and routes the call to OSPS 632 over a dedicated trunk 633 for further processing according to method 700.

In action 716, the OSPS 632 determines that the call requires IBNS verification since that is the only type of call that arrives at the OSPS 632 via dedicated truck 633, and subsequently queries database 638 to determine if it is billable or non-billable for a collect call, according to database 638. If the telephone number is billable according to database 638, OSPS 632 via trunk 633 and switch 50 queries (action 717) LEC database 55 to determine if the number is billable or non-billable. If the number is billable according to databases 638 and 55, the OSPS 632 in action 718 approves the call for completion, makes a trunk connection to LEC switch 50 and generates an automatic message accounting record for the call. If the telephone number is non-billable according to either database 638 or 55, method 700 progresses to action 720 where the OSPS 632 inspects the IBNS call treatment indicator, which is part of the record of database 638, for each number listed therein. If the IBNS call treatment indicator is set to deny, in action 722 the OSPS 632 switches the call to a human receiving operator for further treatment. The receiving operator determines if the foreign call is a collect call and if it is a collect call, audibly denies call completion. If the receiving operator determines that the call is not a collect call but some other type of foreign operator assisted call, the call is allowed to progress toward completion and is switched to LEC portion 16.

If, on the other hand, the IBNS call treatment indicator is set to allow or if there is no indicator for this number, in action 724 the automatic OSPS 632 transmits an audible "collect call disallowed" tone or message back to the foreign PTT operator to, put the foreign PTT operator on notice that a collect call billing will not be honored by the U.S. long distance carrier, but does allow the call to progress toward completion. Next, action 730 of method 700 has OSPS 632 generate an automatic message accounting record that has its IBNS denied field marked. After action 730, the foreign PTT operator may choose to ignore the collect call disallowed tone or message and complete the call. If the foreign PTT operator does so, the foreign PTT company and not the U.S. long distance company is responsible for the expense and billing of the call. If the foreign PTT operator chooses to acknowledge the audible collect call disallowed tone or message, then the collect call will be disconnected by the foreign PTT operator in the foreign PTT network 12.

Figure 8:
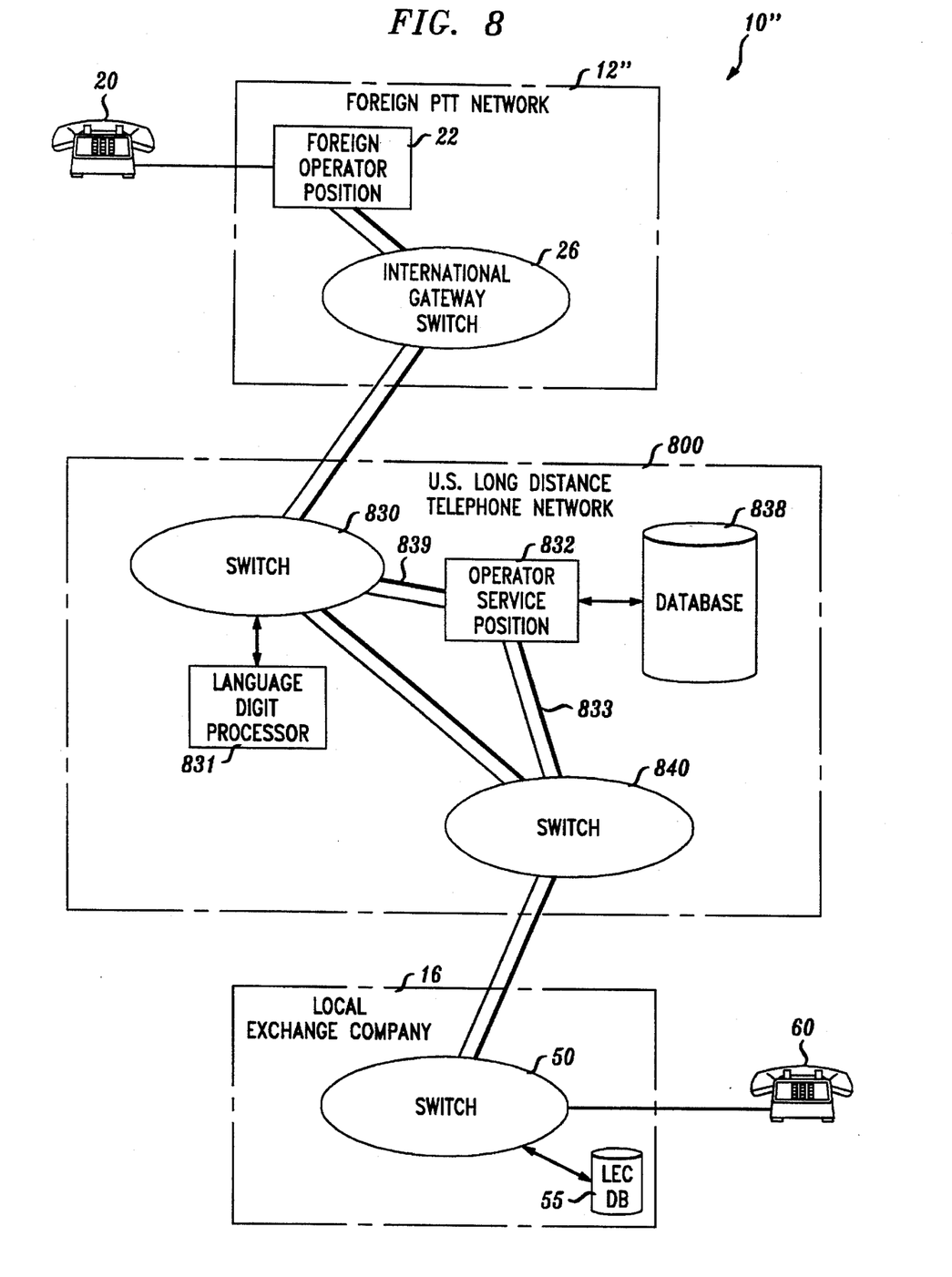
FIG. 8 is a block diagram of yet another apparatus for screening foreign calls according to the invention.
Figure 9:
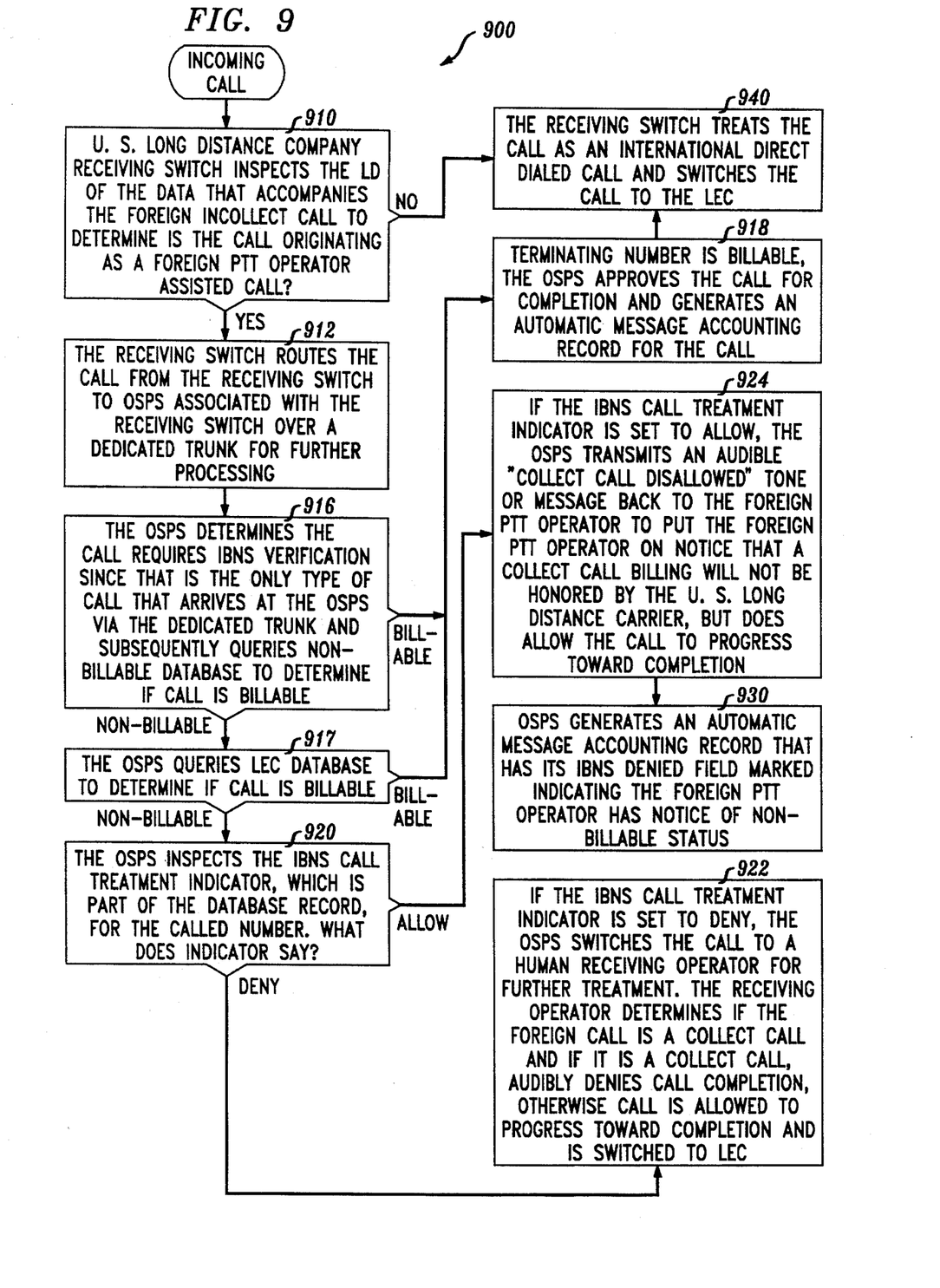
FIG. 9 is a diagram of yet another method for screening foreign calls according to the invention.

Referring to FIGS. 8 and 9, an apparatus 800 and a method 900 are shown that provide yet another way of reducing the number of foreign incollect calls that are completed to non-billable telephone numbers. Apparatus 800 and method 900 also take advantage of the fact that all foreign calls have a language digit (LD) that has a value between 0 and 9 inclusively which indicates the language spoken by the foreign operator to greatly automate the processing of foreign incollect calls. As above in FIGS. 6 and 7, an LD of zero indicates a direct dial call, an LD other than zero indicates some type of operator assisted call.

As in the previous examples, the user of telephone 20 reaches a foreign PTT operator at PTT station 22 and requests a collect call to a telephone number in the United States. The foreign PTT operator at PTT station 22 collects the called number and dials or outpulses it through the PTT international gateway switch 26 to the U.S. long distance system 800, such as the AT&T Switched Network. The PIT operator station 22 or the PTT international gateway switch 26 as mentioned previously adds an LD to the outpulsed line number.

The call reaches switch 830, such as an AT&T model 4E-ISC switch. Switch 830 in action 910 of method 900 the language digit processor 831 inspects the LD of the data that accompanies the foreign incollect call to determine if the call originates as a foreign PTT operator assisted call by checking if LD is not zero.

If LD is zero, the language digit processor 831 instructs switch 830 to treat the call as an international direct dialed call (action 940), which is the normal call processing.

If LD is not zero in action 912 language digit processor 831 instructs the receiving switch 830 to switch the PTT operator assisted call over dedicated trunk 833 to OSPS 832 serving the called number city and state for International Bill Number Screening (IBNS) treatment. The OSPS 832 determines that the call requires IBNS verification since that is the only type of call that arrives at the OSPS 832 via dedicated trunk 839, and subsequently queries database 838 to determine if it is billable or non-billable for a collect call, according to database 838. If the telephone number is billable according to database 838, OSPS 832 via trunk 839, switches 830, 840, and 50 queries (action 917) LEC database 55 to determine if the number is billable or non-billable. If the number is billable according to databases 838 and 55 the OSPS 832 in action 918 approves the call for completion, makes a trunk connection to LEC switch 50 and generates an automatic message accounting record for the call. If the telephone number is non-billable according to either database 838 or 55, method 900 progresses to action 920 where the OSPS 832 inspects the IBNS call treatment indicator, which is part of the record of database 838, for each number listed therein. If the IBNS call treatment indicator is set to deny, in action 922 the OSPS 832 switches the call to a human receiving operator for further treatment. The receiving operator determines if the foreign call is a collect call and if it is a collect call, audibly denies call completion. If the receiving operator determines that the call is not a collect call but some other type of foreign operator assisted call, the call is allowed to progress toward completion and is switched to LEC portion 16. If the telephone number is billable, the OSPS 832 in action 918 approves the call for completion and generates an automatic message accounting record for the call. With this approval, the call is switched via trunk 839 and switch 840 to the LEC portion 16 and to telephone 60 which it is directed whether it is a collect call or some other type of operator assisted call.

If the telephone number is non-billable, method 900 progresses to action 918 where the OSPS 832 inspects the IBNS call treatment indicator, which is part of the database record, for the called number. If the IBNS call treatment indicator is set to deny, the automatic OSPS 832 switches the call to a human receiving operator for further treatment. Next, in action 920, the receiving operator determines if the foreign call is a collect call and if it is a collect call, audibly denies call completion. If the receiving operator determines that the call is not a collect call but some other type of foreign operator assisted call, the call is allowed to progress toward completion and is switched to LEC portion 16.

If, on the other hand, the IBNS call treatment indicator is set to allow or there is no indicator for this number, in action 922 the automatic OSPS 832 transmits an audible "collect call disallowed" tone or message back to the foreign PTT operator to put the foreign PTT operator on notice that a collect call billing will not be honored by the U.S. long distance carrier, but does allows the call to progress toward completion. Next, action 930 of method 900 has OSPS 832 generate an automatic message accounting record that has its IBNS denied field marked. After action 930, the foreign PTT operator may choose to ignore the collect call disallowed tone or message and complete the call. If the foreign PTT operator does so, the foreign PTT company and not the U.S. long distance company is responsible for the expense and billing of the call. If the foreign PTT operator chooses to acknowledge the audible collect call disallowed tone or message, then the collect call will be disconnected by the foreign PTT operator in the foreign PTT network 12.

Method 900 could be greatly simplified if one of the LD codes were to be dedicated to collect calls. With a special LD code, for example LD=9, dedicated to identify foreign incollect calls, only foreign incollect calls would be switched to the OSPS 833 and afforded IBNS treatment by being checked against database 838. In an apparatus, the method would complete the connection if the telephone number was not found in database 838, and if the telephone number was found in databases 838 and 55, an audible tone or message indicating that collect call billing will not be accepted by the U.S. long distance company would be transmitted back to the foreign PTT operator. An automatic message accounted entry would be generated to document the tone or message transmitted, the call is switched to LEC switch 50. The foreign PTT operator can then allow the call to be completed even though it cannot be billed, or the foreign PTT operator can at this time discuss the call with the user of telephone 20 to make other arrangements or discontinue the call.

Thus, it will now be understood that there has been disclosed an apparatus and method for reducing errors and improving efficiency of foreign incollect calls to U.S. telephone numbers. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. An apparatus for identifying to foreign operators foreign incollect calls that are directed to U.S. telephone numbers that are non-billable for collect calls, comprising:

a database containing a plurality of telephone numbers which are non-billable for collect calls;

means for responding to a routing number dialed by a foreign operator processing a telephone number to which a foreign incollect call is directed;

means for receiving and storing the telephone number to which the foreign incollect call is directed from said foreign operator;

means for searching said database to determine if said telephone number to which said foreign incollect call is directed is found therein; and means for audibly signaling the foreign operator that said incollect call is non-billable for collect calls if said telephone number to which said foreign incollect call is directed is found in said database.

2. An apparatus for identifying to foreign operators foreign incollect calls that are directed to U.S. telephone numbers that are non-billable for collect calls, comprising:

a database containing a plurality of telephone numbers which are non-billable for collect calls;

means for responding to a routing number dialed by a foreign operator processing a foreign incollect call with an automatic prompt for the foreign operator to enter a telephone number to which the foreign incollect call is directed;

means for receiving and storing said telephone number to which said foreign incollect call is directed from said foreign operator;

means for searching said database to determine if said telephone number to which said foreign incollect call is directed is found therein; and means for audibly signaling the foreign operator that said incollect call is non-billable for collect calls if said telephone number to which said foreign incollect call is directed is found in said database.

3. An apparatus for screening foreign incollect calls, comprising:

a database containing a plurality of numbers which are non-billable for collect calls;

means for responding to a special routing number entered by a foreign operator processing a telephone number to which a foreign incollect call is directed;

means for automatically prompting said foreign operator to enter the telephone number to which said foreign incollect call is directed;

means for receiving and storing said telephone number to which said foreign incollect call is directed;

means for automatically searching said database to determine if said telephone number to which said foreign incollect call is directed is found therein; and means responsive to said stored telephone number for completing a connection to a telephone having said telephone number only if said telephone number to which said foreign incollect call is directed is not found in said database.

4. The apparatus as set forth in claim 3, further comprising:

means for transmitting an audible indication to said foreign operator of denial of a collect call if said telephone number to which said foreign incollect call is directed is found in said database.

5. The apparatus as set forth in claim 4, further comprising:

means for connecting said foreign operator to a domestic operator to process said telephone number to which said foreign incollect call is directed as some other type of call than a collect call.

6. The apparatus as set forth in claim 4, further comprising:

means for stopping a collect call to said telephone number to which said foreign incollect call is directed.

7. The apparatus as set forth in claim 3, further comprising:

means for connecting said foreign operator to a domestic operator if said telephone number to which said foreign incollect call is directed is found in said database to arrange alternative billing for said foreign incollect call.

8. An apparatus for screening foreign incollect calls, comprising:

a database containing a plurality of numbers which are non-billable for collect calls;

means for responding to a special routing number entered by a foreign operator processing a number to which a foreign collect call is directed;

means for prompting said foreign operator to enter the number to which said foreign collect call is directed;

means for receiving and storing said number to which said foreign collect call is directed;

means for searching said database to which collect calls cannot be billed to determine if said number to which said foreign incollect call is directed is found therein; and means for transmitting an audible indication of a denial of a collect call billing to said foreign operator if said number to which said foreign incollect call is directed is found in said database.

9. An apparatus for identifying foreign incollect calls directed to domestic non-billable for collect calls telephone numbers, comprising:

means for decoding a foreign operator language digit on an incoming call to determine if the call is operator assisted;

means for completing the call normally as a non-collect-call to its telephone number if the call is not operator assisted;

means for adding a special access code to the call at an international gateway switch if the call is operator assisted;

means for switching the call from the international gateway switch to a regional long distance switch;

means for stripping the special access code from each call having such a code;

means for switching each such call to an operator services position system over a dedicated trunk;

means for determining by said operator services position system if a telephone number to which the call is directed is in a non-billable for collect calls database;

means for switching the call to a local exchange company for normal completion to the telephone number to which it is directed if the call is to a telephone number that is not in the non-billable for collect calls database;

means for routing the call to an audible message to the foreign operator that the call is non-billable as a collect call if the call is to a telephone number that is in the non-billable for collect calls database;

means for generating a record that this operator assisted call is non-billable as a collect call and means for switching the call to a switch of said local exchange company for completion.

10. An apparatus for identifying foreign incollect calls directed to domestic non-billable for collect calls telephone numbers, comprising:

means for decoding a foreign operator language digit on an incoming call to determine if the call is operator assisted;

means for completing the call normally as a non-collect-call to its telephone number if the call is not operator assisted;

means for adding a special access code to the call at an international gateway switch if the call is operator assisted;

means for switching the call from the international gateway switch to a regional long distance switch;

means for stripping the special access code from each call having such a code;

means for switching each such call to an operator services position system over a dedicated trunk;

means for determining by said operator services position system if a telephone number to which the call is directed is in a non-billable for collect calls database;

means for switching the call to a domestic operator to determine if the call is a collect call or some other type of operator assisted call;

means for completing the call to a LEC switch if the call is some other type of operator assisted call;

means for arranging for alternative billing of the collect call if the call is a collect call,; and means for switching the call to the LEC switch for normal completion to said telephone number after such alternative billing is arranged.

11. An apparatus for preventing foreign incollect calls from being billed to a domestic non-billable for collect calls telephone number, comprising:

means for decoding a foreign operator language digit on an incoming call to determine if the call is operator assisted;

means for completing the call normally as a non-collect-call to its telephone number if the call is not operator assisted;

means for switching the call to an operator services position system over a dedicated trunk if the call is operator assisted;

means for determining by said operator services position system if a telephone number to which the call is directed is in a non-billable for collect calls database;

means for switching the call to a telephone company providing local service to the telephone number to which the foreign incollect call is directed for normal completion to the telephone number to which it is directed if the call is to a telephone number that is not in the non-billable for collect calls database;

means for routing the call to an audible message to the foreign operator that the call is non-billable as a collect call if the call is to a telephone number that is in the non-billable for collect calls database;

means for generating a record that this foreign operator assisted call is non-billable as a collect call; and means for switching the call to a switch of said telephone company providing local service for completion.

12. An apparatus for preventing foreign incollect calls from being billed to a domestic non-billable for collect calls telephone number, comprising:

means for decoding a foreign operator language digit on an incoming call to determine if the call is operator assisted;

means for completing the call normally as a non-collect-call to its telephone number if the call is not operator assisted;

means for switching the call to an operator services position system over a dedicated trunk if the call is operator assisted;

means for determining by said operator services position system if a telephone number to which the call is directed is in a non-billable for collect calls database;

means for switching the call to a domestic operator to determine if the call is a collect call or some other type of operator assisted call;

means for completing the call to said telephone company providing local service to the telephone number to which the call is directed if the call is some other type of operator assisted call;

means for arranging for alternative billing of the collect call if the call is a collect call;

means for switching the call to said telephone company providing local service to the telephone number to which the call is directed for normal completion to its telephone number after such alternative billing is arranged; and means for stopping the collect call if alternative arrangements is not arranged.

13. A method of preventing foreign incollect calls from being billed to a domestic non-billable for collect calls telephone number, comprising the steps of:

decoding an operator language digit on an incoming call to determine if the call is operator assisted;

if the call is not operator assisted, completing the call normally as a non-collect-call to its telephone number;

if the call is operator assisted, determining if a telephone number to which the call is directed is in a non-billable for collect calls database;

if the call is to a telephone number that is not in the non-billable for collect calls database, completing the call normally to its telephone number; and if the call is to a telephone number that is in the non-billable for collect calls database routing the call to an audible message that the call will not be billed to the telephone number to which it is directed.

14. A method of preventing foreign incollect calls from being billed to a domestic non-billable for collect calls telephone number, comprising the steps of:

decoding an operator language digit on an incoming call to determine if the call is operator assisted;

if the call is not operator assisted, completing the call normally as a non-collect-call to its telephone number;

if the call is operator assisted, determining if a telephone number to which the call is directed is in a non-billable for collect calls database;

if the call is to a telephone number that is not in the non-billable for collect calls database, completing the call normally to its telephone number; and if the call is to a telephone number that is in the non-billable for collect calls database routing the call to a domestic operator to determine if the call is a collect call, and if it is, arrange alternate billing for the call.

15. A method of preventing foreign incollect calls from being billed to a domestic non-billable for collect calls telephone numbers, comprising the steps of:

decoding a foreign operator language digit on an incoming call to determine if the call is operator assisted;

if the call is not operator assisted, completing the call normally as a non-collect-call to its telephone number;

if the call is operator assisted, switching the call to an operator services position system over a dedicated trunk;

determining by said operator services position system if a telephone number to which the call is made is in a non-billable for collect calls database;

if the call is to a telephone number that is not in the non-billable for collect calls database, switching the call to a telephone company providing local service to the telephone number to which the call is directed for normal completion to its telephone number; and if the call is to a telephone number that is in the non-billable for collect calls database, routing the call to a domestic operator station for alternative billing arrangements and switching the call to said telephone company providing local service to the telephone number to which the call is directed for normal completion to the telephone number.

16. A method of preventing foreign incollect calls from being billed to a domestic non-billable for collect calls telephone number, comprising the steps of:

decoding a foreign operator language digit on an incoming call to determine if the call is a foreign incollect call;

if the call is not a foreign incollect call processing the call normally to its telephone number;

if the call is a foreign incollect call, switching the call to an operator services position system over a dedicated trunk;

determining by said operator services position system if a telephone number to which the call is made is in a non-billable for collect calls database;

if the call is to a telephone number that is not in the non-billable for collect calls database, switching the call to a telephone company providing local service to the telephone number to which the call is directed for normal completion to its telephone number; and     if the call is to a telephone number that is in the non-billable for collect calls database routing the call to a domestic operator station for alternative billing arrangements and switching the call to said telephone company providing local service for normal completion to the telephone number.

17. A method of preventing foreign incollect calls from being billed to a domestic no-collect call telephone, comprising the steps of:

decoding a foreign operator language digit on an incoming call to determine if the call is a foreign incollect call;

if the call is not a foreign incollect call processing the call normally to the telephone number;

if the call is a foreign incollect call, switching the call to an operator services position system over a dedicated trunk;

determining by said operator services position system if a telephone number to which the call is made is in a non-billable for collect calls database;

if the call is to a telephone number that is not in the non-billable for collect calls database, switching the call to a telephone company providing local service to the telephone number to which the call is directed for normal completion to its telephone number; and     if the call is to a telephone number that is in the non-billable for collect calls database, routing the call to an audible message that billing for a collect call is denied and switching the call to a switch of said telephone company providing local service.

18. A method of identifying foreign incollect calls from being billed to a domestic non-billable for collect calls telephone number, comprising the steps of:

decoding a foreign operator language digit on an incoming call to determine if the call is operator assisted;

if the call is not operator assisted, completing the call normally as a non-collect-call to its telephone number;

if the call is operator assisted, adding a special access code to the call at the international gateway switch and switching the call to a regional long distance switch;

stripping the special access code from each call having such a code and switching each such call to an operator services position system over a dedicated trunk;

determining by said operator services position system if a telephone number to which the call is directed is in a non-billable for collect calls database;

if the call is to a telephone number that is not in the non-billable for collect calls database, switching the call to a telephone company providing local service to the telephone number to which the call is directed for normal completion to the telephone number to which it is directed;

if the call is to a telephone number that is in the non-billable for collect calls database routing the call to an audible message to the foreign operator that the call is non-billable as a collect call;

generating a record that this operator assisted call is non-billable as a collect call and     switching the call to said telephone company providing local service for completion.

19. A method of identifying foreign incollect calls from being billed to a domestic non-billable for collect calls telephone number, comprising the steps of:

decoding a foreign operator language digit on an incoming call to determine if the call is operator assisted;

if the call is not operator assisted, completing the call normally as a non-collect-call to its telephone number;

if the call is operator assisted, adding a special access code to the call at the international gateway switch and switching the call to a regional long distance switch;

stripping the special access code from each call having such a code and switching each such call to an operator services position system over a dedicated trunk;

determining by said operator services position system if a telephone number to which the call is directed is in a non-billable for collect calls database;

if the call is to a telephone number that is not in the non-billable for collect calls database, switching the call to a telephone company providing local service to the telephone number to which the call is directed for normal completion to its telephone number;

if the call is to a telephone number that is in the non-billable for collect calls database routing the call to an audible message to the foreign operator that the call is non-billable as a collect call;

switching the call to a domestic operator to determine if the call is a collect call or some other type of operator assisted call;

if the call is some other type of operator assisted call, completing the call to said telephone company providing local service; and     if the call is a collect call, arranging for alternative billing of the collect call and switching the call to said telephone company providing local service for normal completion to its telephone number after such alternative billing is arranged, otherwise stopping the call.

20. A method of preventing foreign incollect calls from being billed to a domestic non-billable for collect calls telephone number, comprising the steps of:

decoding a foreign operator language digit on an incoming call to determine if the call is operator assisted;

if the call is not operator assisted, completing the call normally as a non-collect-call to its telephone number;

if the call is operator assisted, switching the call to an operator services position system over a dedicated trunk;

determining by said operator services position system if a telephone number to which the call is directed is in a non-billable for collect calls database;

if the call is to a telephone number that is not in the non-billable for collect calls database, switching the call to a telephone company providing local service for normal completion to the telephone number to which it is directed;

if the call is to a telephone number that is in the non-billable for collect calls database routing the call to an audible message to the foreign operator that the call is non-billable as a collect call;

generating a record that this operator assisted call is non-billable as a collect call; and switching the call to said telephone company providing local service for completion.

21. A method of preventing foreign incollect calls from being billed to a domestic non-billable for collect calls telephone number, comprising the steps of:

decoding a foreign operator language digit on an incoming call to determine if the call is operator assisted;

if the call is not operator assisted, completing the call normally as a non-collect-call to its telephone number;

if the call is operator assisted, switching each such call to an operator services position system over a dedicated trunk;

determining by said operator services position system if a telephone number to which the call is directed is in a non-billable for collect calls database;

if the call is to a telephone number that is not in the non-billable for collect calls database, switching the call to a telephone company providing local service to the telephone number to which the foreign incollect call is directed for normal completion to its telephone number;

if the call is to a telephone number that is in the non-billable for collect calls database routing the call to an audible message to the foreign operator that the call is non-billable as a collect call;

switching the call to a domestic operator to determine if the call is a collect call or some other type of operator assisted call;

if the call is some other type of operator assisted call, completing the call to said telephone company providing local service; and if the call is a collect call, arranging for alternative billing of the collect call and switching the call to said telephone company providing local service for normal completion to its telephone number after such alternative billing is arranged, otherwise stopping the call.

* * * * *